(12) United States Patent
Neumann et al.

(10) Patent No.: US 8,820,081 B2
(45) Date of Patent: Sep. 2, 2014

(54) METHOD FOR OPERATING A POWER PLANT

(75) Inventors: Dirk Neumann, Essen (DE); Marcus Kurth, Duisburg (DE); Udo Sommer, Hamm (DE)

(73) Assignee: STEAG Energy Services GmbH, Essen (DE)

( * ) Notice: Subject to any disclaimer, the term of this patent is extended or adjusted under 35 U.S.C. 154(b) by 208 days.

(21) Appl. No.: 13/203,208

(22) PCT Filed: Feb. 24, 2010

(86) PCT No.: PCT/EP2010/001129
§ 371 (c)(1),
(2), (4) Date: Nov. 7, 2011

(87) PCT Pub. No.: WO2010/097203
PCT Pub. Date: Sep. 2, 2010

(65) Prior Publication Data
US 2012/0117969 A1    May 17, 2012

(30) Foreign Application Priority Data
Feb. 27, 2009 (EP) .................................. 09153976

(51) Int. Cl.
*F01K 13/02* (2006.01)
*F03G 6/00* (2006.01)
*F03G 6/06* (2006.01)

(52) U.S. Cl.
CPC ................. *F01K 13/02* (2013.01); *Y02E 10/46* (2013.01); *F03G 6/065* (2013.01)
USPC ............ 60/652; 60/641.8; 60/664; 60/641.15

(58) Field of Classification Search
CPC ........... F03G 6/06; F03G 6/064; F03G 6/065; F03G 6/067; F01K 13/02
USPC ........... 60/652, 660–662, 516, 616, 618, 670, 60/614, 597, 682, 646, 657, 641.8, 60/676–680
See application file for complete search history.

(56) References Cited

U.S. PATENT DOCUMENTS 4,069,674 A * 1/1978 Warren ......................... 60/641.8
4,164,848 A * 8/1979 Gilli et al. ........................ 60/652
(Continued)

FOREIGN PATENT DOCUMENTS

FR    2916101    8/2009

OTHER PUBLICATIONS

Von G. Falgenhauer, "Beitragsmoglichkeiten der Speisewasser-, Kondensat- und Anzapfdampfstrome zur schnellen Leistungsanderung fossil befeuerter Kraftwerkblocke" VGB Kraftwekstechnik, Bd. 60, Nr.1, Jan. 1, 1980, pp. 18-23.

(Continued)

*Primary Examiner* — Thomas Denion
*Assistant Examiner* — Laert Dounis
(74) *Attorney, Agent, or Firm* — Nelson Mullins Riley & Scarborough LLP

(57) ABSTRACT

A method for operating a hybrid power plant comprising fuel-operated heating and solar energy heating of carrier fluids, wherein a first portion of total power provided by the power plant is based on fuel-operated heating of carrier fluids and a second portion of the total power is based on solar energy heating of carrier fluids, the heat absorbed by a solar energy heated carrier fluid is transferred to a carrier fluid circuit of a fuel-operated part of the power plant. When a sudden increase or reduction of the total power provided by the power plant is required as compared to a basic state, the second portion is first increased or reduced over a short time period in order to provide a positive or negative reserve power. Subsequently, the first portion is slowly increased or reduced and the second portion based on solar energy heating is correspondingly reduced or increased again.

15 Claims, 2 Drawing Sheets

(56) References Cited

U.S. PATENT DOCUMENTS

| | | | | |
|---|---|---|---|---|
| 4,438,630 | A | * | 3/1984 | Rowe .............................. 60/676 |
| 5,924,287 | A | | 7/1999 | Best |
| 2003/0218385 | A1 | | 11/2003 | Bronicki |
| 2006/0174622 | A1 | * | 8/2006 | Skowronski ................. 60/641.8 |
| 2008/0127647 | A1 | * | 6/2008 | Leitner ........................... 60/645 |
| 2009/0121495 | A1 | * | 5/2009 | Mills ............................ 290/4 D |
| 2009/0125152 | A1 | * | 5/2009 | Skowronski et al. ......... 700/281 |
| 2011/0100004 | A1 | * | 5/2011 | Al-Mazeedi ................. 60/641.8 |
| 2011/0277469 | A1 | * | 11/2011 | Brenmiller et al. .......... 60/641.8 |

OTHER PUBLICATIONS

Dr. Von R. Sindelar, "Gewahrleistung der Sekundendynamik eines Dampfkraftwerksblockes", VGB Kraftwerkstechnik, Bd. 71, Nr. 1, Jan. 1, 1991, pp. 4-13.

* cited by examiner

METHOD FOR OPERATING A POWER PLANT

CROSS-REFERENCE TO RELATED APPLICATIONS

This application claims the benefit of European patent application 09153976.7, filed Feb. 27, 2009, and corresponding Patent Cooperation Treaty Application No. PCT/EP2010/001129, filed Feb. 24, 2010, each herein incorporated by reference.

FIELD OF THE INVENTION

The present invention relates to a method of operating a power plant such that if, starting from a base condition, a step shaped increase or reduction in the total power (instantaneous power) produced by the power plant is necessary, a (corresponding) positive or negative power reserve is rapidly provided.

BACKGROUND OF THE INVENTION

For power plants, which operate together in an interconnected network system, there are certain requirements as regards the reserve power to be held in readiness. Since electric energy is not storable to a significant extent, a balance must always be produced in an interconnected network system between the power fed in by the power plants and the power removed by consumers. In normal operation, this power balance is achieved at a desired frequency, which is 50 Hz in Europe, whereby the power plant generators, which are coupled to the mains network in a fixed frequency relationship, rotate at constant speed. Any disturbance to the power balance results in a change in speed and thus in frequency. The maintenance of the power balance is achieved by the power plants involved by the holding of reserve power available. In order to be able to react to disturbances or nearly step shaped load changes, reserve power must be held in readiness by the producer. Thus, for instance, in accordance with the current regulations in Germany or Europe, the effective electric power of a participating power plant unit must be increased by at least two percent within 30 s (see Verband der Netzbetreiber VDN e. V., at the VDEW, 'Transmission Code 2007—Netz—and Systemregeln der deutschen Übertragungsnetzbetreiber', version 1.1, Berlin, August 2007, Chapter 3.3.7.1, page 27/90 and UCTE Operation Handbook, Policy P1, Brussels, V2.2, 20.07.2004).

In a 'fuel operated power plant', meaning here a power plant burning fossil fuels or a nuclear power plant, such a rapid change in the power produced by the power plant cannot be achieved by changing the fuel flow (change in the amount of fossil fuel supplied or change in the position of the control and absorber rods in a nuclear power plant). For this reason, the turbine inlet valves are usually not completely opened in such power plants (so that the power output would depend only on the outlet pressure of the steam generator) but are instead throttled to make a spinning reserve power output available by opening that valves. Another known possibility for making a rapid reserve usable within seconds available resides in briefly and temporarily switching off high pressure or low pressure preheaters on the steam and/or water side in order to reclaim the energy branched off from the turbines for these elements (i.e. to leave it in the turbines).

Of disadvantage with these known measures is the reduction in the efficiency of the plant or an uneconomic provision of reserve power, which is associated, for instance, with the persistent throttling of the turbine inlet valves. It is therefore the object of the invention to avoid these disadvantages.

SUMMARY OF THE INVENTION

The present invention provides a method of operating a hybrid power plant with the heating of carrier fluids by fuel and solar energy. The invention is based on the fundamental idea of creating a hybrid power plant with an additional solar energy heating of carrier fluids and making use of the possibilities of a rapid change in output which thus becomes available.

In a method in accordance with the invention of operating a hybrid power plant with fuel operated and solar energy heating of carrier fluids, a first proportion of the total power produced by the power plant is based on the fuel-operated heating of carrier fluids and a second power proportion of the total power produced by the power plant is based on the solar energy heating of carrier fluids. The heat absorbed by a carrier fluid heated by solar energy is transferred to a circuit of a carrier fluid of the part of the power plant operated with fuel. If, starting from a base condition, a sudden increase or reduction in the total power produced by the power plant becomes necessary, the second proportion based on solar energy heating is firstly rapidly increased or reduced in order to provide a positive or negative power reserve. The first proportion based on heating by fuel is then slowly increased or reduced and the second proportion based on solar energy heating is correspondingly reduced or increased again. The slow increase or reduction in the first proportion based on heating by fuel can commence directly after the temporary, rapid increase or decrease in the second proportion based on solar energy heating; it can, however, also only begin at a later time. Furthermore, the corresponding slow reduction or increase in the second proportion based on solar energy heating (i.e. the recreation of the reserve) need not occur in synchronism with the slow increase or reduction in the first proportion based on heating by fuel. The second proportion based on heating by solar energy is increased or reduced by focusing or defocusing of solar collectors, by increased or reduced throughput of the carrier fluid heated by solar energy and/or by emptying or filling a reservoir filled with the carrier fluid heated by solar energy.

The possibility, which is based on the added heating of carrier fluids by solar energy, of providing a reserve power within seconds also has the advantage that the investment and operating costs for the generation of electricity by solar energy are reduced by the incorporation into an energy generator operated with fuel which is already present or which is in any way required. Furthermore, the use of fuel-operated energy generation enables round the clock operation in an economical manner.

A further advantage of the combination in accordance with the invention of the fuel-operated and solar energy heating of carrier fluids resides in the fact that the start-up procedures for the part of the power plant operated with fuel can be designed more economically.

In a preferred embodiment, the circuit for the carrier fluid of the fuel-operated part of the power plant, to which the heat absorbed by a carrier fluid heated by solar energy is transferred, is connected to a turbine set so that the carrier fluid heated by solar energy does not need to be connected to a separate turbine unit. This joint flow of the proportion of the energy produced by solar power into the turbine set of the part of the power plant operated by fuel results in a significantly better efficiency and a better utilisation of the energy provided by solar power than would be the case with a separate turbine set for power generation using only solar energy. Furthermore, as a result of such coupling, the investment and operating costs for the solar generation of electricity decrease considerably. On the investment side, costs for an individual water-steam circuit including the steam turbine set, the cooling circuit at the cold end and the electric power conduction substantially disappear. On the operating cost side, the running costs for staff, repairs, inspection, maintenance and insurance are reduced.

In a preferred embodiment, the second proportion of the total power produced by the power plant, which is based on the heating of carrier fluids by solar power, is less than 50%, preferably less than 30%. This enables round the clock operation at a high delivered power, even during the times of day in which there is no or only low sunshine.

In order to completely fulfill the requirements referred to above for a spinning reserve power by the heating of a carrier fluid by solar energy, it is provided in a preferred embodiment that in the rapid increase or reduction of the second proportion of the total power produced based on heating with solar energy, the increase or reduction is effected at a rate of 2-5% within a time period of less than 30 s, preferably of about 3-5% in less than 5 s. This rate can be adjustable and changeable or equivalent to the change in load. The method is preferably characterised in that, in the subsequent slow increase or reduction of the first proportion based on heating with fuel, the power produced is increased or reduced at a rate of 2-5% within a time period of at least 1.5 min, preferably at least 3 min, as is common, for instance, in conventional fuel-operated power plants.

The heat absorbed from the carrier fluid heated by solar energy is preferably transferred to a water-steam circuit of the fuel-operated power plant. In one embodiment, in which the carrier fluid heated by solar energy also includes water or steam, it is fed directly into the water-steam circuit of the part of the power plant operated by fuel. In another embodiment, the heat absorbed by the carrier fluid heated by solar energy is transferred to the water-steam circuit by means of a heat exchanger.

In a preferred embodiment of the invention, the heat absorbed by the carrier fluid heated by solar energy is transferred to feed water of the part of the power plant operated by fuel. As a result of the use of heat produced by solar energy for heating the feed water, less steam needs to be extracted out of the turbines for this purpose, whereby the necessary reserve power can be provided more rapidly. The heat absorbed by the carrier fluid heated by solar energy can be transferred by means of a heat exchanger (in the high pressure region) to the feed water, which has been removed from a feed water tank and is to be supplied to a steam generator. It can also be transferred by means of a heat exchanger (in the low pressure region) to the feed water leaving a condenser connected downstream of the turbine and to be supplied to a feed water tank. Finally, the heat can be transferred by means of a heat exchanger to water which is fed from a demineralised water supply to a feed water tank.

There are further advantageous and preferred embodiments associated with the method of the present invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will be described below in more detail by way of preferred exemplary embodiments illustrated in the drawings which are not necessarily to scale, wherein.

DETAILED DESCRIPTION OF THE INVENTION

The following detailed description of the embodiment(s) is merely exemplary in nature and is no way intended to limit the invention, its applications, or uses.

Figure 1:
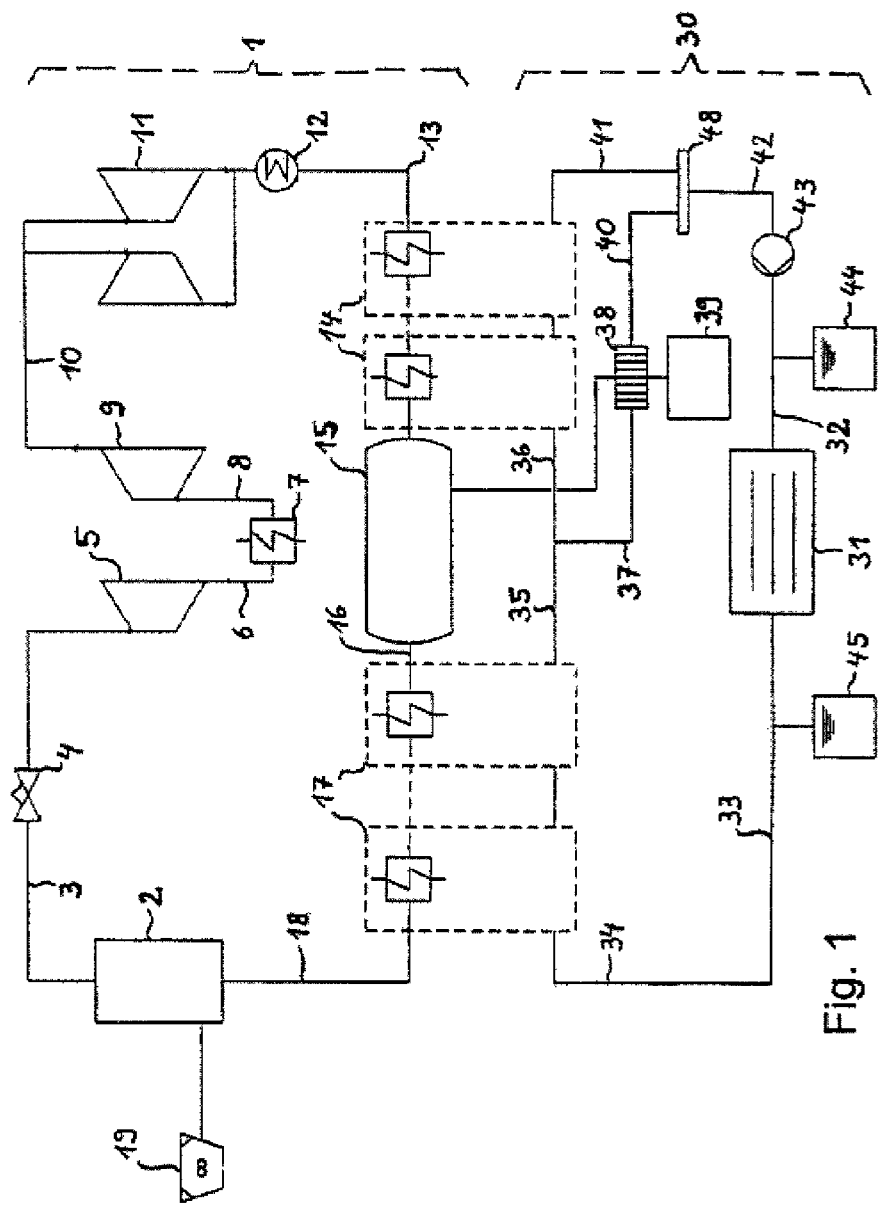
FIG. 1 is a schematic view of an exemplary embodiment of a hybrid power plant, which is operated by the method in accordance with the invention.

FIG. 1 is a schematic view showing the basic principle of a hybrid power plant, which can be operated by the method in accordance with the invention. The illustrated hybrid power plant has firstly a power plant part 1 operated by fuel, in which steam is produced by means of a steam generator 2 by the combustion of a fossil fuel, for instance coal, and is supplied via a live steam conduit 3, in which a turbine inlet valve 4 is generally incorporated, to a high pressure turbine 5. The steam leaving the high pressure turbine 5 is fed via a conduit 6 to a hot intermediate superheater (HIS) 7 and then flows via the conduit 8 to a medium pressure turbine 9 and subsequently via the conduit 10 to a low pressure turbine 11. The steam flows from there into a condenser 12. The steam condenses here and the water which is produced is fed via the conduit 13 into a plurality of low pressure pre-heaters 14 connected in series. The water leaving the low pressure pre-heaters 14 flows into the feed water tank 15 and constitutes the feed water supply. A pump system (not shown) conveys the feed water out of the feed water tank 15 via the conduit 16 through one or more high pressure pre-heaters 17 arranged in series before the heated feed water again flows under pressure into the steam generator 2, whereby the circuit is completed.

The fuel (coal) supplied to the combustion space at the steam generator 2 is fed, for instance, from roller bowl mills 19, which grind the coal. For the purpose of preheating the feed water in the low pressure pre-heaters 14 and for heating the feed water in the high pressure pre-heater 17, steam is commonly used, which is extracted out of the circuit at a suitable position, for instance at the turbines or at the HIS. As a result of extracting the hot steam, which is fed to the heat exchangers in the pre-heaters 14 and 17, less steam is available for driving the turbines, which reduces their output.

Thus when operating the power plant in accordance with the invention, a proportion of the heat of this steam which is extracted is replaced by the heat of a carrier fluid heated by solar energy, i.e. less steam is extracted to the pre-heaters 14 and/or 17 and in its place the feed water is warmed with the aid of the carrier fluid heated by solar energy in parallel heat exchangers of the pre-heaters 14 and 17. In particular, the replaced proportion of the steam can be rapidly altered (increased or reduced). For this purpose, the power plant shown in FIG. 1 has a solar energy part 30. The solar energy part 30 has a solar heating field 31, which consists of adjustable radiation collectors, such as parabolic trough collectors, Fresnel collectors or others. A carrier fluid which is to be heated by solar energy is fed to the solar heating field via a conduit 32. The heated carrier fluid leaving the solar heating field 31 flows via conduit 33 and conduit 34 to one or more high pressure pre-heaters 17. In the example illustrated in FIG. 1, the heated carrier fluid is conducted in countercurrent through heat exchangers of the high pressure pre-heaters 17 so that it enters the first high pressure pre-heater 17 on that side on which the heated feed water leaves via conduit 18. The carrier fluid leaving the high pressure pre-heaters via conduit 35 flows via conduit 36 to one or more low pressure pre-heaters 14 for pre-heating the feed water. The carrier fluid is supplied via conduit 37 to a heat exchanger 38, where it gives up heat to demineralised water, which has been removed from a demineralised water tank 39 and is supplied to the feed water supply in the feed water tank 15. The carrier fluid leaving the heat exchanger 38 via conduit 40 and the carrier fluid leaving the low pressure pre-heaters 14 via conduit 41 are combined and fed via conduit 42 to a solar field pump 43, which in turn feeds the carrier fluid 32 into the solar heating field 31. Connected to the conduit 32 is an expansion tank 44 and connected to the conduit 33 is an expansion tank 45.

In the exemplary embodiment shown in FIG. 1, the heat of the carrier fluid heated by solar energy is used not only for additionally heating the feed water in the high pressure pre-heaters 17 but also for pre-heating the feed water in the low pressure pre-heaters 14 and for pre-heating the demineralised water in the heat exchanger 38. In alternative embodiments, only a proportion of these possibilities can be implemented. Furthermore, further possibilities for transferring the heat of the carrier fluid heated by solar energy to the water-steam circuit of the part 1 of the power plant operated with fuel are possible. For instance, a heat exchanger could be provided directly in the feed water tank 15.

Furthermore, the heat content of all the stores (feed water supply, demineralised water tank, heat stored in the high pressure and low pressure pre-heaters) which may be filled with carrier fluid heated by solar energy is preferably tracked so that in the event of a sudden demand on the power reserve, a decision can be taken in a flexible and optimised manner how heat produced by solar energy can be used. Thus that measure can be selected which leads to the best result.

In the exemplary embodiment illustrated in FIG. 1, the circuit for the carrier fluid of the solar heating part 30 of the power plant is separate from the water-steam circuit of the fuel-operated part 1 of the power plant. In such a closed system, the heat is transferred to the water-steam circuit only indirectly via heat exchangers. This permits the use of optimised solar heating carrier fluids, such as thermal oils with high vaporisation temperatures, and thus operation at low pressures.

Figure 2:
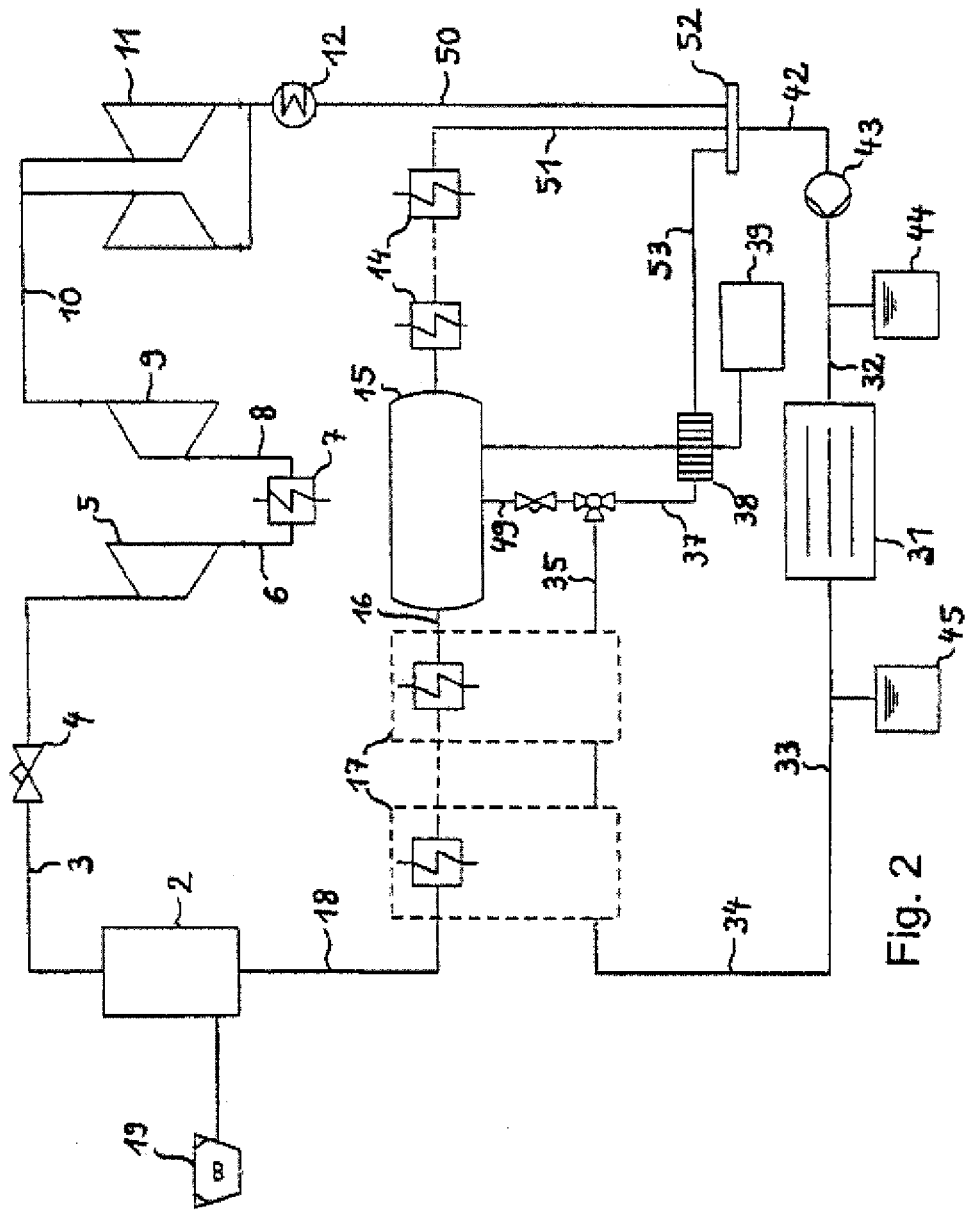
FIG. 2 shows a second embodiment of a hybrid power plant, which is operated in accordance with the invention.

FIG. 2 shows an alternative embodiment of the hybrid power plant, in which an open integration is used. This means that hot water heated by solar energy or steam is introduced at one or more points into the water-steam circuit of the part of the power plant operated by fuel. Water for feeding the solar heating field 31 is removed from the water-steam circuit at another position.

In the exemplary embodiment illustrated in FIG. 2, those components which correspond to components shown in FIG. 1 are indicated with the same reference numerals. The circuit of the part of the power plant operated with fuel consists again of the steam generator 2, the live steam conduit 3, the turbine inlet valve 4, the high pressure turbine 5, the conduit 6, the hot intermediate superheater 7, the conduit 8, the medium pressure turbine 9, the conduit 10, the low pressure turbine 11, the condenser 12, the low pressure pre-heaters 14, the feed water tank 15, the conduit 16 (with the pressure pump which is not shown), the high pressure pre-heaters 17 and the conduit 18. In the example under consideration, water is removed from the condensate region of the part of the power plant operated with fuel and fed to the solar energy installation 30. This can be implemented, as shown, by means of a conduit 50 from the condenser 12 to a collecting point 50 and a conduit 51 from the collecting point to the low pressure pre-heaters 14. Alternatively, the conduit 51 for feeding the low pressure pre-heaters can also branch directly off from the conduit 50 with a suitable control valve. In the exemplary embodiment shown in FIG. 2, the water heated by thermal energy, which enters the high pressure pre-heaters 17 via conduit 34 and leaves again via conduit 35, is not fed to the heat exchangers of the low pressure pre-heaters. Instead, there is a conduit 49, via which the water heated by solar energy leaving the conduit 35 can be fed directly to the feed water tank 15. The water heated by solar energy leaving the conduit 35 can be fed via conduit 37 to the heat exchanger 38 and then via conduit 53 to the collecting point 52. The water to be supplied to the solar heating field 31 is also fed from the collecting point 52 via the conduit 42 and the solar field pump 43.

In a preferred embodiment of the exemplary embodiment illustrated in FIG. 2, the carrier fluid leaving the solar heating field 31 via the conduit 33 is hot water. This has the advantage over steam that the entire system is simpler to implement since a complex condensate/water drainage management system is not necessary. A boiling drum may also be omitted.

Both of the exemplary embodiments illustrated in the figures include heating of the demineralised water fed to the feed water tank 15 from the demineralised water tank 39 by means of the heat exchanger 38. Additionally or alternatively, it is also possible for a heat exchanger to be disposed directly in the demineralised water tank so that it can act itself as a heat store. The water leaving the heat exchanger of the demineralised water tank 39 in this case, which is fed via conduit 40 or 53 to a collecting point 48 or 52, accordingly has a lower return flow temperature. This enables smaller dimensioning of the connecting conduits between the collection point and the solar heating field.

In normal operation of the power plants illustrated in the figures, the provision of power produced by solar energy to the steam power plant is effected as soon as adequate heat production in the solar heating field commences at which the solar field pump can sensibly be energetically operated. On commencement of the minimum circulation volume of the solar field pump 3, the delivery of heat to the feed positions commences. A system operating with a liquid carrier fluid instead of steam has the advantage that the system does not first need to be heated up to the vaporisation point and heat can instead be supplied to the feed points as soon as such a thermal transfer is meaningful. This results in reduced heating up losses and in lower heat losses to the environment in the cool hours of the morning and evening with a lower external temperature. The total output from the solar heating field increases. With an increase in the heat production in the solar heating field, all the heat sources referred to above of the part of the power plant operated by fuel can be supplied after reaching a predetermined inlet flow temperature. The use of a liquid carrier fluid in the integrated situation described above additionally offers the advantage that the effect of banks of clouds moving through can be obviated by heat stores in the solar field and can not terminate steam production by solar energy. The passing through of such banks of clouds results only in a sliding inlet temperature.

In accordance with the invention, the installation offers the possibility of providing reserve energy in a matter of seconds. Furthermore, reserve or other additional power for dynamically altering the power of the plant can also be provided in a matter of minutes. The power of the plant (part of the power plant operated by fuel) can thus rapidly be altered by the magnitude of the power from the solar heating field. The power produced by the solar heating field can in turn be altered relatively rapidly, for instance by focussing or defocusing the solar collectors or switching in further solar collectors or switching out solar collectors. Furthermore, the inlet temperature (in the conduit 33) can be reduced or increased in a targeted manner by increasing or reducing the volume circulated and by operating within the material boundaries. In particular, the power can be rapidly produced by the turbines, namely in the same amount as energy produced by solar heating is supplied to the high pressure pre-heaters 17 or the lower pressure pre-heaters 14, and a correspondingly lower amount of power is removed from the turbines for pre-heating purposes. The same applies of course to other heat exchangers, which remove their heat from steam, which was removed from the turbines. Furthermore, the heat generated by solar power can be redistributed by reducing the amount of carrier fluid flowing through one heat exchanger and correspondingly increasing the amount of the carrier fluid flowing through another heat exchanger. For instance, redistribution from the low pressure pre-heaters to the high pressure pre-heaters or vice versa is possible. Further power redistributions are possible by a targeted reduction in the return flow temperature and switching in further low pressure pre-heaters. If a rapid dynamic power reduction is to be achieved, the solar collectors can be defocused on the one hand, and on the other hand heat, which is fed directly into the water-steam circuit, can be deflected in heat exchangers, for instance into the demineralised water tank. Furthermore, thermal power could be moved out of the high pressure pre-heaters to the low pressure pre-heaters. A turbine extraction leading to the low pressure pre-heaters or the high pressure pre-heaters could also be switched in and the solar field heat moved into one of the aforementioned stores.

The coupling of a part 1 of a power plant operated by fuel with the solar energy heating of carrier fluids and the feeding of the heat produced by solar energy into the water-steam circuit of the part 1 of the power plant, as described with reference to FIGS. 1 and 2, also has advantages when starting up a power plant after a shutdown. For instance, the heat produced by solar energy can be used for keeping parts of the plant hot, for instance the boiler or the feed water tank or, when starting up, for pre-heating the feed water tank and other parts of the plant. Particularly in plants which are frequently started up and stopped, large savings are achieved by a reduced or eliminated usage of starting fuels.

In one embodiment, a small low pressure turbine or a Sterling engine can be connected to the feed water tank 15 such that steam produced there can be delivered to the small low pressure turbine/the Sterling engine. During stoppage of the part of the power plant operated by fuel, the carrier fluid (hot water) heated by solar energy in the solar heating field 31 can be fed into the feed water tank and heat the feed water. The steam thus produced can then be supplied to this small low pressure turbine/the Sterling engine.

Numerous alternative embodiments are possible within the scope of the inventive concept defined in the claims. For instance, a number of power plant units operated with fuel could be coupled with respective to their separated water-steam circuits with a common solar heating field. Alternatively, a number of solar heating circuit units can also be provided, which transfer heat at different points to the water-steam circuit of the fuel-operated power plant. Instead of a coal fired part power plant, a part of the power plant can also be used which burns any other fuel (e.g. gas, oil or waste). The solar heating part can also be connected to a nuclear power plant.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

The invention claimed is:

1. A method of operating a hybrid power plant, having a first power plant part operated with fuel and a second power plant part operated with solar energy, for the heating of carrier fluids by fuel and by solar energy, the method comprising:
   producing a first proportion of total power by the hybrid power plant based on fuel-operated heating of carrier fluids,
   producing a second proportion of total power by the hybrid power plant based on solar energy-operated heating of carrier fluids,
   transmitting heat absorbed by a solar energy heated carrier fluid to a circuit for the fuel-heated carrier fluid of the first power plant part operated with fuel,
   wherein if, starting from a base condition, an abrupt increase or reduction in the total power produced by the hybrid power plant is necessary,
   (i) firstly, the second proportion based on solar energy heating is rapidly increased or reduced, respectively, in order to provide a positive or negative rapid power reserve, respectively, and
   (ii) then the first proportion based on heating by fuel is slowly increased or reduced, respectively, and the second proportion based on heating by solar energy is correspondingly reduced or increased, respectively, again, and
   wherein the second proportion based on heating by solar energy is increased or reduced, respectively, by focusing or defocusing, respectively, of solar collectors, by increased or reduced throughput, respectively, of the solar energy heated carrier fluid, by emptying or filling a reservoir filled with the solar energy heated carrier fluid, or by a combination thereof,
   wherein in the rapid increase or reduction of the second proportion of the total power produced based on heating by solar energy, the increase or reduction is effected at a rate of 2% to 5% within a time period of less than 30 s, and in the subsequent slow increase or reduction of the first proportion of the total power produced based on heating by fuel, the increase or reduction is effected at a rate of 2% to 5% within a time period of at least 1.5 min.

2. The method as claimed in claim 1, wherein the circuit for the fuel-heated carrier fluid of the first power plant part operated with fuel, to which the heat absorbed by the solar energy heated carrier fluid is transmitted, is coupled to a turbine unit.

3. The method as claimed in claim 1, wherein the second proportion of the total power produced by the power plant, which is based on the solar energy heated carrier fluid, is less than 50%.

4. The method as claimed in claim 1, wherein the heating by solar energy of the carrier fluid is reduced in a normal operating state in order to provide the positive power reserve.

5. The method as claimed in claim 1, wherein heat absorbed from the solar energy heated carrier fluid is transmitted to a water-steam circuit of the first power plant part of the power plant operated with fuel.

6. The method as claimed in claim 5, wherein the carrier fluid heated by solar energy includes water or steam and is fed into the water-steam circuit of the first power plant part of the power plant operated with fuel.

7. The method as claimed in claim 5, wherein heat absorbed from the solar energy heated carrier fluid is transmitted to the water-steam circuit by means of a heat exchanger.

8. The method as claimed in claim 5, wherein heat absorbed from the solar energy heated carrier fluid is transmitted to feed water of the first power plant part of the power plant operated with fuel.

9. The method as claimed in claim 8, wherein heat absorbed by the solar energy heated carrier fluid is transmitted by means of a heat exchanger to the feed water, which is removed from a feed water tank and is to be supplied to a steam generator.

10. The method as claimed in claim 8, wherein heat absorbed by the solar energy heated carrier fluid is transmitted by means of a heat exchanger to the feed water discharging from a condenser connected downstream of a turbine and to be supplied to a feed water tank.

11. The method as claimed in claim 8, wherein heat absorbed by the solar energy heated carrier fluid is transferred by means of a heat exchanger to water, which is supplied from an additional feed water supply to a feed water system.

12. The method as claimed in claim 2, wherein the solar energy heated carrier fluid is not coupled to a separate turbine unit.

13. The method as claimed in claim 3, wherein the second proportion of the total power produced by the power plant, which is based upon the solar energy heated carrier fluid, is less than 30%.

14. The method as claimed in claim 1, wherein in the rapid increase or reduction of the second proportion of the total power produced based on the solar energy heated carrier fluid, the increase or reduction is effected at a rate of 3% to 5% in less than 5 s.

15. The method as claimed in claim 1, wherein in the subsequent slow increase or reduction in of the first proportion of the total power produced based on heating by fuel, the increase or reduction is effected at a rate of 2% to 5% within a time period of at least three minutes.

* * * * *